United States Patent
Senarath et al.

(10) Patent No.: US 8,320,826 B2
(45) Date of Patent: Nov. 27, 2012

(54) POWER CONTROL AT A RELAY STATION IN A WIRELESS NETWORK

(75) Inventors: Nimal Senarath, Nepean (CA); David Steer, Nepean (CA); Derek Yu, Kanata (CA); Hang Zhang, Nepean (CA); Peiying Zhu, Kanata (CA); Wen Tong, Ottawa (CA); Israfil Bahceci, Nepean (CA)

(73) Assignee: Research In Motion Limited, Waterloo, Ontario (CA)

( * ) Notice: Subject to any disclaimer, the term of this patent is extended or adjusted under 35 U.S.C. 154(b) by 779 days.

(21) Appl. No.: 12/197,767

(22) Filed: Aug. 25, 2008

(65) Prior Publication Data

US 2009/0053994 A1 Feb. 26, 2009

Related U.S. Application Data

(60) Provisional application No. 60/957,831, filed on Aug. 24, 2007.

(51) Int. Cl.
*H04B 3/36* (2006.01)
(52) U.S. Cl. ...... 455/7; 455/8; 455/9; 455/10; 455/11.1; 455/12.1
(58) Field of Classification Search .......... 455/7–25
See application file for complete search history.

(56) References Cited

U.S. PATENT DOCUMENTS

| 7,218,891 | B2 | 5/2007 | Periyalwar |
| 2008/0009243 | A1* | 1/2008 | Hart ............ 455/67.13 |

FOREIGN PATENT DOCUMENTS

| CA | 2415132 | 6/2003 |
| EP | 1734669 | 12/2006 |

OTHER PUBLICATIONS

IEEE, "Part 16: Air Interface for Fixed and Mobile Broadband Wireless Access Systems," IEEE P802.16j/D6a, 314 pages (Jul. 23, 2008).

(Continued)

*Primary Examiner* — Fayyaz Alam
(74) *Attorney, Agent, or Firm* — Fish & Richardson P.C.

(57) ABSTRACT

A wireless network includes a base station and a relay station for extending wireless coverage of the base station. Downlink data is sent by the base station and relayed through the relay station to a mobile station, where the downlink data is associated with a preamble that is sent directly from the base station to the mobile station. A transmit power of the relay station is adjusted for transmitting the downlink data from the relay station to the mobile station to reduce a difference between a first power level of the preamble received at the mobile station and a second power level of the downlink data received at the mobile station. The uplink transmit power of the mobile station for the data sent to the relay station is adjusted to compensate for the difference in path loss from mobile station to base station and mobile station to relay station and to compensate for the difference in noise_plus_interference level at relay station compared to that of the base station.

18 Claims, 6 Drawing Sheets

OTHER PUBLICATIONS

IEEE, "Part 16: Air Interface for Broadband Wireless Access Systems," P802.16Rev2/D5, 2,040 pages (Jun. 2008).
K. Voudouris et al., "RElay based Wireless Network and standarD—Rewind," 2 pages (2008).
Z. Wei, "Capacity Analysis for Multi-hop WiMAX Relay," 4 pages (2007).
J. Orr, "Future WiMAX relay stations have you hop until you drop," http://www.wimax.com/commentary/blog/blog-2008/future-wimax-relay-stations-have-you-hop-until-you-drop—WIMAX, 2 pages (Feb. 15, 2008).
Canadian Patent Office, International Search Report and Written Opinion for International Application No. PCT/IB2008/003825, 10 pages, Aug. 4, 2009.

* cited by examiner

POWER CONTROL AT A RELAY STATION IN A WIRELESS NETWORK

CROSS-REFERENCE TO RELATED APPLICATIONS

This application claims the benefit under 35 U.S.C. §119 (e) of U.S. Provisional Application Ser. No. 60/957,831, entitled "Relay and Repeater Operation Mechanisms," filed Aug. 24, 2007, which is hereby incorporated by reference.

TECHNICAL FIELD

The invention relates generally to performing power control at a relay station that is used for extending coverage of a base station in a wireless network.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

Another type of wireless access technology is the WiMax (Worldwide Interoperability for Microwave Access) technology. WiMax is based on the IEEE (Institute of Electrical and Electronics Engineers) 802.16 Standard. The WiMax wireless access technology is designed to provide wireless broadband access.

In a WiMax wireless network, base stations are provided to offer wireless access in corresponding coverage areas. An issue associated with using many base stations is that each base station requires a dedicated backhaul connection in an access service network (for example, base stations are connected by these backhaul connections to one or more ASN gateways in a WiMax wireless network).

To alleviate the issue of having too many base stations and corresponding dedicated backhaul connections, the concept of relay stations has been proposed for standardization in IEEE 802.16j, which is also referred to currently as the Multihop Relay (MR) Specification. Within a coverage area of a base station (referred to as an MR base station in the Multihop Relay context), one or more relay stations can be provided to provide coverage for certain zones (which can be dead zones for the base station, for example) within the coverage area. A benefit of using relay stations is that backhaul connections do not have to be provided between the relay stations and other components of the access service network. A mobile station within the coverage area can connect wirelessly with either the base station or a relay station in the coverage area, for both uplink and downlink communications.

Information sent wirelessly on the downlink to a mobile station includes a frame start preamble and payload data. A preamble is sent from the base station to the mobile station to allow the mobile station to acquire the downlink data (payload data). The preamble can include information such as modulation scheme, transmission rate, length of time to transmit an entire data frame, and so forth. In a Multihop Relay wireless network, a preamble may be sent directly from the base station to the mobile station, even though the corresponding downlink data may be relayed through the relay station to the mobile station. The preamble is sent by the base station to the mobile station is typically highly coded and thus well protected from interference (to increase the likelihood of reliable receipt by the mobile station in a coverage area). On the other hand, downlink data sent from the base station is not as highly coded and therefore not as protected from interference. As a result, in certain zones within a coverage area, downlink data and uplink data would have to be relayed through a relay station rather than communicated directly from the base station to the mobile station.

When the mobile station is relatively far away from the base station within a coverage area, the preamble received by the mobile station from the base station suffers a relatively large path loss from the base station to the mobile station. However, even though the mobile station may be far away from the base station, the mobile station can be quite close to a relay station that is relaying downlink data to the mobile station. As a result, the downlink data received from the relay station by a mobile station can have a power level that is significantly higher than the power level of the preamble received by the mobile station.

A wireless receiver in a mobile station typically includes an adjustable gain control (AGC) circuit that is used to adjust a gain applied to a received signal based on some indication of the expected power level of received signals. If the automatic gain control is performed based on the power level of the preamble received directly from the base station, then this may cause received downlink data that is at a high power level from the relay station to be out of range, which can cause the AGC circuit to not be able to receive the downlink data properly. More specifically, the AGC circuit in the mobile station may not be able to track the sharp variation of power of the downlink data as compared to the preamble power, which can cause a data recovery failure. Moreover, open loop power control for uplink transmission, which is performed using downlink path loss and/or uplink noise plus interference level information, would not operate as desired, which can cause enhanced uplink interference. With a relay station present, the downlink path loss is from the relay station to the mobile station instead of the base station to the mobile station; similarly the uplink noise and interference should be measured at the relay station instead of the base station.

SUMMARY

In general, according to an embodiment, a method for use in a wireless network including a base station and a relay station for extending wireless coverage of the base station includes communicating downlink data sent by the base station and relayed through the relay station to a mobile station, wherein the downlink data is associated with a preamble that is sent directly from the base station to the mobile station A transmit power of the relay station is adjusted for transmitting the downlink data from the relay station to the mobile station to reduce a difference between a first power level of the preamble received at the mobile station and a second power level of the downlink data received at the mobile station.

In another embodiment, the uplink transmit power of the mobile station is adjusted so as to take into account the difference between the base station-to-mobile station path loss and the relay station-to-mobile station path loss, and the fact that the noise plus interference level is measured at the relay station instead of the base station.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
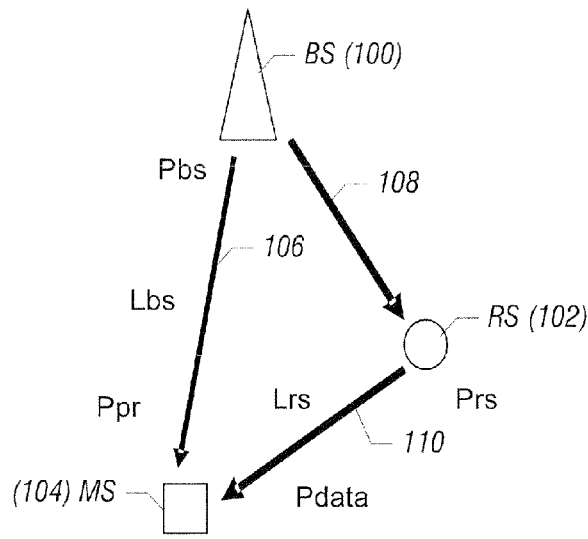
FIG. 1 is a block diagram of an exemplary wireless network that incorporates an embodiment of the invention.

FIG. 1 illustrates a portion of a wireless network, such as a WiMax (Worldwide Interoperability for Microwave Access) network, or other type of network, that includes a base station 100, a relay station 102, and mobile station 104. Note that although reference is made to WiMax and standards corresponding to WiMax, it is noted that techniques according to some embodiments are applicable to other types of wireless networks in which mobile stations can receive control information from the base station and data from the relay station. Other possible wireless technologies include the LTE (Long Term Evolution) technology, from 3GPP, which seeks to enhance the UMTS (Universal Mobile Telecommunications System) technology; code division multiple access (CDMA) technology; orthogonal frequency division multiple access (OFDMA) technology; and so forth. In some embodiments, the base station, relay station, and mobile station operate according to the Multihop Relay (MR) Specification as defined in a proposed IEEE 802.16j standard. Note that although reference is made to the MR Specification and the IEEE 802.16j standard, it is noted that embodiments of the invention are applicable to the standard as it is modified or evolved over time, as well as to subsequent standards that evolve from the MR Specification and the IEEE 802.16j standard. The Multihop Relay context, the base station 100 is referred to as an MR base station.

The mobile station 104 of FIG. 1 is within a coverage area of the base station 100. The relay station 102 in the coverage area of the base station 100 is provided to extend the wireless coverage of the base station 100 for a particular zone of the coverage area that may correspond to a zone of reduced coverage (e.g., dead zone) of the base station 100. A "relay station" refers to any component in the coverage area of a base station that is able to receive information from the base station (in the downlink direction), and forward the information to the mobile station. In the uplink direction, a relay station is a component that receives information from the mobile station, and forwards that information from the relay station to the base station. In some implementations, the relay station has digital processing capabilities, and is able to extract information, decode/encode the information, demodulate/modulate the information, and so forth.

FIG. 1 illustrates the communication of downlink information from the base station 100 to the mobile station 104 that is within zone corresponding to the relay station 102. The downlink information includes a preamble (or other type of control information) that is sent directly from the base station 100 to the mobile station 104 along path 106. The downlink information further includes downlink data (that is associated with the preamble) that is sent along path 108 from the base station 100 to the relay station 102. In turn, the relay station 102 relays the downlink data along path 110 from the relay station 102 to the mobile station 104. In the ensuing discussion, reference is made to preambles; note that techniques according to some embodiments are also applicable to downlink transmissions in which downlink data is associated with other types of control information.

Various parameters are also represented in FIG. 1. Pbs represents the power of the preamble transmitted by the base station 100 to the mobile station 104. Lbs represents the path loss (in terms of power) along path 106 from the base station 100 to mobile station 104. Ppr (which is equal to Pbs–Lbs) is the Dower of the preamble as received by the mobile station 104.

Prs represents the power of the downlink data as transmitted by the relay station 102, while Lrs represents the path loss along path 110 from the relay station to the mobile station. Pdata represents the power of the downlink data as received by the mobile station 104.

Note that if the mobile station 104 were not in the zone of the relay station 102, then both the preamble and downlink data would be sent directly from the base station 100 to the mobile station 104.

Note also that the mobile station can send uplink data (not shown) either directly to the base station or relayed to the base station through the relay station.

When the mobile station 104 is relatively far away from the base station 100, the preamble received by the mobile station from the base station suffers a relatively large path loss from the base station to the mobile station. However, even though the mobile station may be far away from the base station, the mobile station can be quite close to the relay station 102 that is relaying downlink data to the mobile station. As a result, the downlink data received from the relay station by a mobile station can have a power level (Pdata) that is significantly higher than the power level of the preamble (Ppr) received by the mobile station.

A wireless receiver in the mobile station 104 typically includes an adjustable gain control (AGC) circuit that is used to adjust a gain applied to a received signal based on some indication of the expected power level of received signals. If the automatic gain control is performed based on the power level of the preamble received directly from the base station 100, then this may cause received downlink data that is at a high power level from the relay station to be out of range, which can cause the AGC circuit to not be able to receive the downlink data properly.

In accordance with some embodiments, to address this issue, a mechanism is provided to enable the power level (Prs) of the relay station 102 to be adjusted (e.g., reduced) to address the issue associated with the downlink data power (Pdata) being significantly higher than the preamble power (Ppr).

In another embodiment, it is noted that the uplink transmission power of the mobile station also should be adjusted based upon the difference between the base station-to-mobile station path loss and the relay station-to-mobile station path loss, and to take into account the fact that the noise plus interference level is measured at the relay station instead of the base station.

Figure 2:
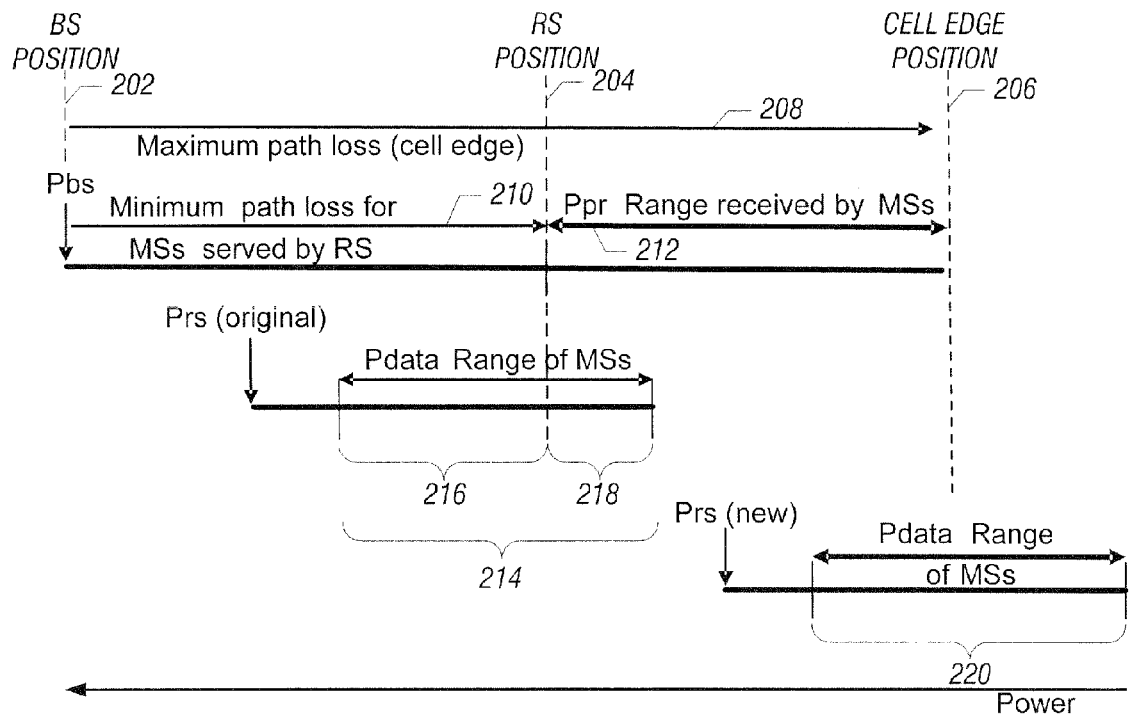
FIG. 2 is a graph that illustrates various power levels associated with communications among a base station, relay station, and mobile stations in the wireless network of FIG. 1.

FIG. 2 graphically depicts adjustment of the relay station transmit power (Prs) for transmitting downlink data from the relay station to the mobile station. The original relay station transmit power Prs (prior to adjustment) is represented as Prs(original) in FIG. 2, whereas the adjusted relay station transmit power Prs is represented as Prs(new) in FIG. 2. Note that in the graph of FIG. 2, the left hand side of the graph represents higher power while the right hand side of the graph represents lower power.

Positions of the base station, relay station, and a cell edge are represented with vertical dashed lines in FIG. 2. A vertical dashed line 202 represents the base station position, a vertical dashed line 204 represents the relay station position, and the vertical dashed line 206 represents the cell edge position (the edge of the coverage area of the base station).

An arrow 208 from the base station position 202 to the cell edge position 206 represents the maximum path loss of information transmitted by the base station to a mobile station located at the cell edge position 206.

An arrow 210 from the base station position 202 to the relay station position 204 represents the minimum path loss (Lbs in FIG. 1) for the preamble sent by a base station to mobile stations. What this means is that for a mobile station that is located at the relay station position 204, the path loss experienced for the preamble sent by the base station is the path loss along path 108 (FIG. 1) between the base station and a relay station.

Double arrow 212 represents the range of the power level Ppr of the preamble that can be received by the mobile stations within the coverage zone of the relay station. Ppr varies depending on how close or how far away a mobile station is from the base station. Note that Ppr=Pbs−Lbs (transmit power of base station less the path loss Lbs from the base station to the mobile station).

In FIG. 2, assuming that the transmit power of downlink data from the relay station is Prs(original), then the possible range of the power of the downlink data (Pdata) as received by mobile stations is indicated by 214 in FIG. 2. The Pdata range specifies the possible Pdata power levels that can be observed by different mobile stations depending on their positions relative to the relay station. Within the range 214, a first subrange 216 specifies a region in which Pdata is greater than the largest Ppr value that can be observed by any mobile station, and a second subrange 218 specifies a region in which Pdata is less than the largest Ppr value. For a mobile station that receives downlink data at a power level within the first subrange 216, there is some likelihood that Pdata will be greater than Ppr by a sufficient amount such that the AGC circuit of the mobile station receiver will not be able to correctly recover the received downlink data.

To address the above issue, the transmit power Prs of the relay station is adjusted such that it becomes lower, represented as Prs(new) in FIG. 2. With the reduced Prs value, the Pdata range is represented as 220 in FIG. 2. With the reduced transmission power of the relay station, it is more likely that the downlink data will be received at a power that will be correctly recovered by the mobile station, since Pdata will likely be less than Ppr, or will exceed Ppr by a small enough margin that the AGC circuit in the mobile station receiver will still process the downlink data properly.

The power reduction of Prs for the relay station can be accomplished without adversely impacting the C/I (carrier-to-interference ratio) performance for downlink data sent from the relay station to the mobile station if the relay station and base station operate in two different channels (in other words, there is frequency and/or time separation between the relay station and base station), and either one of the following two conditions are provided.

First, the system is noise limited in that coverage zones of relay stations are sufficiently far apart such that a relay station does not experience interference from outside the coverage zone of the relay station, such as interference from another relay station. Since no interference is present, relay station transmit power Prs can be reduced to a minimum (some predefined decibel (dB) above the noise level).

Second, in a system that is interference limited (where a mobile transmission to/from the relay station experiences interference from other relay stations), the following plan (depicted in FIG. 3) can be implemented to manage relay station-to-relay station interference.

Figure 3:
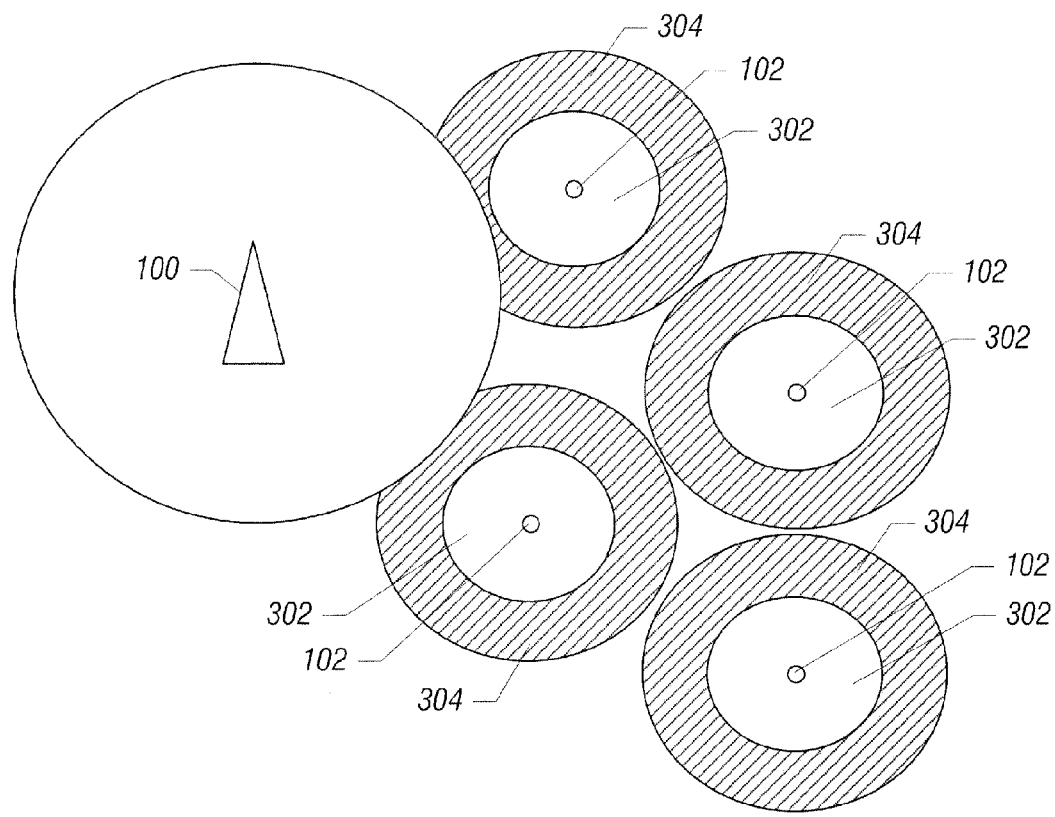
FIG. 3 illustrates exemplary coverage zones of relay stations in a coverage area of a base station.

FIG. 3 illustrates deployment of multiple relay stations 102 within a coverage area of the base station 100. The respective coverage zones 302 for corresponding relay stations 102 are depicted as white regions. Within these regions 302, the C/I margin is a predefined dB above the noise level, which means that adequate coverage is provided by the corresponding relay station 102 in the coverage zone 302.

Outside of each coverage zone 302 of a relay station 102 is a corresponding region 304 (cross-hatched) that cannot be covered by the corresponding relay station 102, due to weak C/I in the region 304. In these regions 304, the base station 100 is used to provide coverage. By planning the coverage zones 302 of multiple relay stations 102 within a base station coverage area properly, reduction of transmit powers Prs of the relay stations does not prevent adequate performance for transmission of downlink data by the relay stations 102.

Figure 4A:
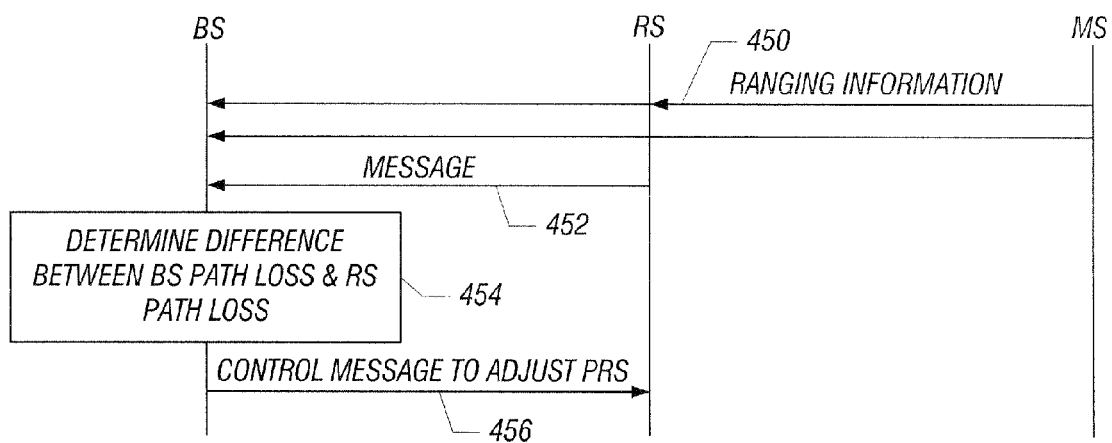
FIG. 4A is a message flow diagram of a process of adjusting a power level for downlink communication from the relay station, in accordance with an embodiment.

It is noted that the downlink transmit power Prs can be adjusted either by the base station or the relay station. In the embodiment in which the Prs adjustment is controlled by the base station, the following procedure can be performed, as depicted in FIG. 4A. When the mobile station first accesses a wireless network, the mobile station may send (at 450) ranging information (e.g., a ranging code) to the base station. An example of the ranging procedure is described in the IEEE 802.16e standard. This ranging information is received by both the base station and the relay station. In response to the ranging information, the relay station forwards (at 452) a message to the base station, with the message containing information (e.g., power level) from which the base station can determine the path loss from the relay station to the mobile station. Based on the ranging information received from the mobile station and the message received from the relay station, the base station is able to determine (at 454) the difference between a first path loss from the base station to the mobile station and a second path loss from the relay station to the mobile station. Based on the difference between the first and second path losses, the base station sends (at 456) a control message to the relay station to adjust Prs. Note that adjustment of Prs can also compensate for differences in antenna gain, differences in receiver noise, differences in cable losses, and so forth.

Alternatively, instead of the procedure of FIG. 4A, another technique of adjusting Prs involves the mobile station measuring a preamble signal power level that is transmitted by the base station. The measurement of the preamble signal power level is then sent in the uplink to the base station (directly or via the relay station), from which the base station can derive the base station-to-mobile station path loss.

For a TDD system, the RS-MS path loss can be deduced from uplink measurement at the Relay station. Alternatively, MS can be instructed to measure a data or beacon signal from the RS. In response to the measured power level of the signal from the relay station to the mobile station, the mobile station sends the measurement data back to the base station, from which the base station can derive the relay station-to-mobile station path loss.

The above describes techniques for adjusting relay station downlink Prs for a time division duplex (TDD) system (in which the same frequency is used for uplink and downlink communications between the relay station and mobile station). Similar techniques can also be applied to frequency division duplex (FDD) systems. In an FDD system, uplink measurements cannot be used for deducing downlink path loss. In the FDD system, to determine downlink path losses, the mobile station can measure signals from the base station and relay station, and then send those measurements to the base station. For the uplink path losses, the mobile station can use, for example, ranging signals sent by the mobile station, with the relay station and base station observing the received level of such ranging signal. The relay station will forward its measurement to the base station to allow the base station to determine the difference between the base station path loss and relay station path loss.

As noted above, in another embodiment, the uplink transmit power of the mobile station is adjusted based upon the difference between the base station-to-mobile station path loss and the relay station-to-mobile station path loss, and taking into account the fact that the noise plus interference level is measured at the relay station instead of the base station.

Figure 4B:
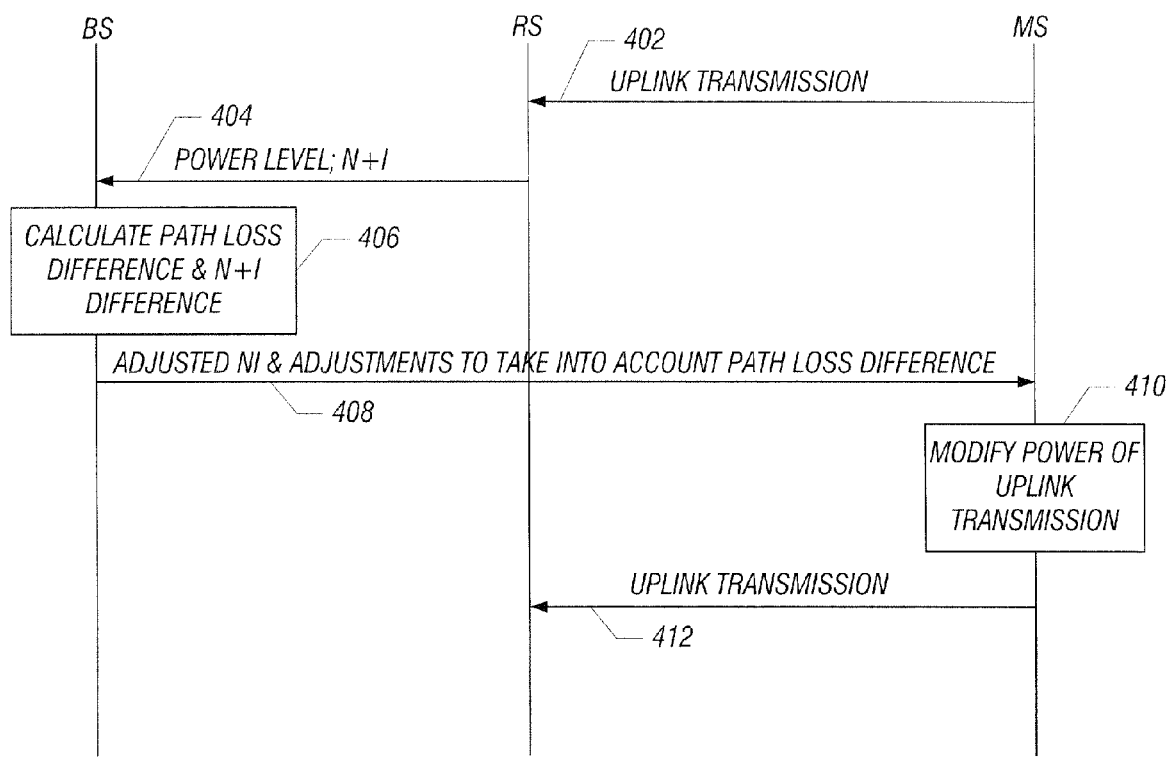
FIG. 4B is a message flow diagram of a process of adjusting a power level of uplink communication from the mobile station to the relay station, in accordance with an embodiment.

In accordance with some embodiments, FIG. 4B shows a procedure for adjusting the uplink transmission power of the mobile station for uplink transmission to the relay station to compensate for the difference in uplink path losses (between base station and mobile station and between relay station and mobile station). The relay station measures the uplink transmission (sent at 402) of the mobile station. Based on the measurement of the uplink transmission, the relay station sends (at 404) to the base station an indication of the power level of the uplink transmission measured by the relay station. In addition, the relay station informs the base station of the noise plus interference (N+I) level experienced by the relay station in the uplink.

Based on these two measurements, the base station can calculate (at 406) the path loss difference as well as the N+I difference, and an adjusted N+I is then sent (at 408) from the base station to the mobile station. In some systems, such as those based on the IEEE 802.16e standard, the N+I information is broadcast and cannot be specified for an individual mobile station. Therefore, the adjustment may be included as a mobile station specific parameter (e.g., the Offset_SSperSS and/or Offset_BSperSS parameters according to IEEE 802.16e, which can be adjusted to reflect the differences).

In addition, for a TDD system, these uplink measurements can be used to estimate the path loss differences in the downlink and the base station can send the relay station a signal to adjust the relay station downlink transmit power as required to avoid or reduce the likelihood of excessive Pdata causing data recovery failure at the mobile station.

The mobile station then modifies (at 410) the power of its uplink transmission to the relay station based on the adjusted NI. The uplink transmission according to the modified power is sent (at 412) by the mobile station to the relay station.

It is noted that the procedure of FIG. 4B can also be extended to perform downlink power control of Prs. The relay station is aware that the power level of the uplink transmission (412) is to have been modified by some incremental amount and therefore can continually monitor path loss difference Lbs−Lrs. In this way, the uplink transmission will not suffer from not taking into account that the N+I (noise plus interference level) measurement at the relay station is different from the same measurement at the base station. For a TDD system, the adjustment of the downlink transmission power Prs based on the measured uplink transmission (412) can be performed since the same frequency is used for both the uplink and downlink transmissions between the relay station and the mobile station. For a TDD system, since the same frequency is used for both the uplink and downlink, it is expected that the path loss between the relay station and mobile station in both the uplink and downlink directions is the same.

For an FDD system, the relay station downlink power can be adjusted by the mobile station measuring the signals from both the base station and relay station, and then sending those measurements to the base station. For the uplink, the mobile station power adjustment can be done, for example, by using the ranging signal sent by the mobile station and observing the received power level of the ranging signal at the base station and relay station. The relay station forwards its measurement to the base station, and the base station instructs the mobile station to perform the adjustment that takes into account the path loss difference of the base station-mobile station path and the relay station-mobile station path in the uplink and the noise plus interference level.

In an alternative embodiment, instead of the relay station making the decision regarding how much to adjust Prs, the base station can instead determine how much adjustment of Prs is necessary. The base station can then send the notification of the amount of adjustment of Prs needed to the relay station.

The embodiments described above are applicable to relay stations with relatively small coverage zones. However, for relay stations having relatively large coverage zones (where a relay station is considered to have a large coverage zone if the relay station transmit power is great enough to cause interference at another relay station), reduction of relay station transmit power Prs in the manner described above cannot resolve the AGC problem. Deploying relay stations in the manner described above result in an interference limited system where substantial interference among relay stations can prevent proper operation. In such a scenario, unless all the relay stations reduce power at the same time, the C/I performance of some relay stations may be adversely impacted.

To address the above issue, mobile stations served by any relay station are grouped into multiple mobile station groups based on their path loss differences (Lbs−Lrs difference). Recall that Lbs is the path loss from the base station to the mobile station, and Lrs is the path loss from the relay station to the mobile station. Depending on the path loss difference, the transmit power level of the relay station is to be reduced to substantially equalize the base station and the relay station transmit power levels (the power levels do not have to be exactly matched, but they should be equilibrated to the point to obtain a tractable level difference). The mobile station groups with similar differences in the path loss are served at the same time by all the relay stations.

Figure 5:
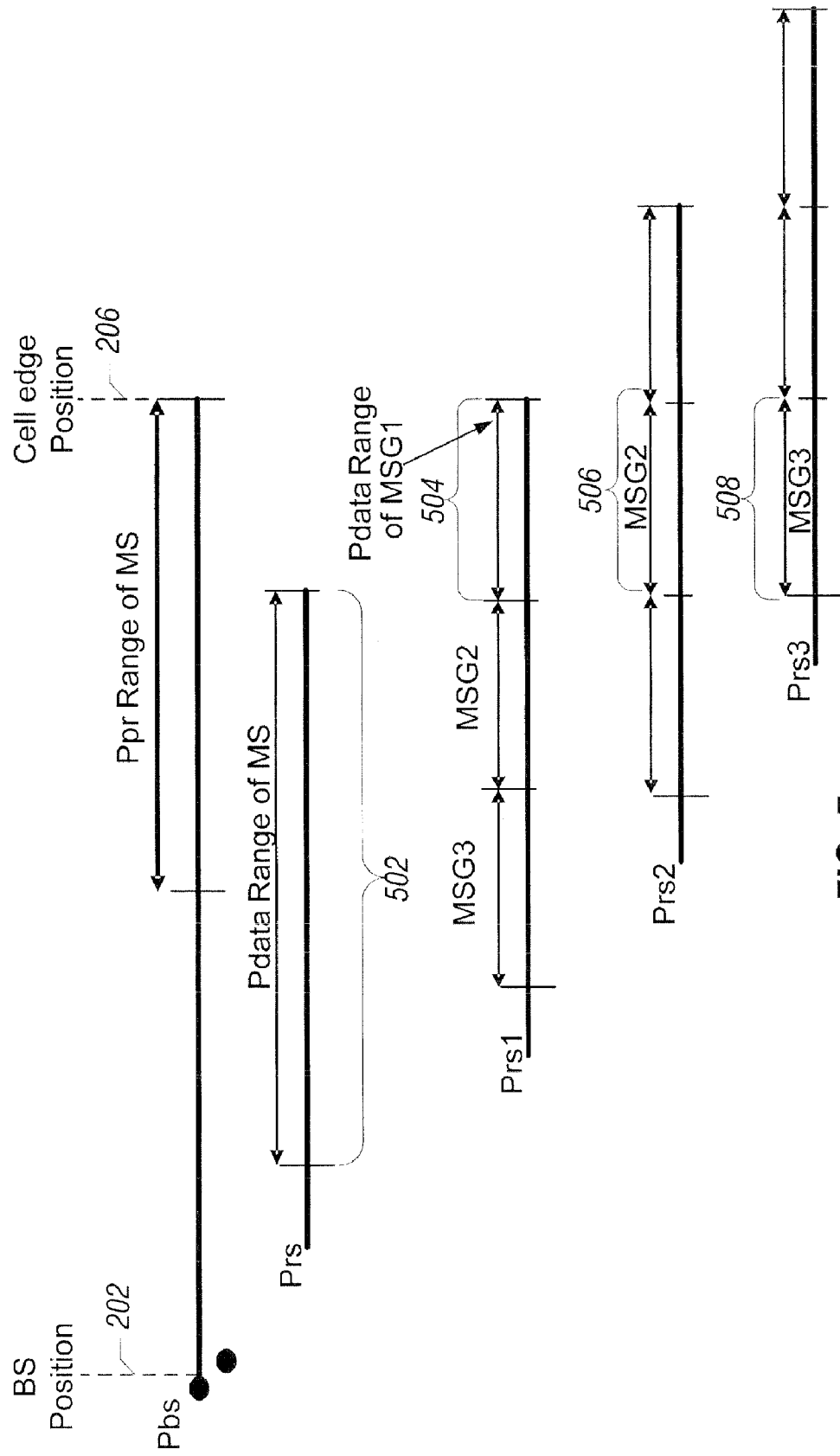
FIG. 5 is a graph that illustrates multiple mobile station groups and corresponding relay station transmit powers, in accordance with another embodiment.

In the example of FIG. 5, three mobile station groups MSG1, MSG2, and MSG3 are defined. For mobile station group MSG1, the relay station power is reduced to Prs1. For mobile station group MSG2, the relay station power is reduced to Prs2, where Prs2 is less than Prs1. For mobile station group MSG3, the relay station power is reduced to Prs3, where Prs3 is less than Prs2.

FIG. 5 also depicts a Pdata range 502 for an original relay station transmit power Prs. However, for MSG1, where the relay station transmit power is Prs1, the Pdata range 502 has been reduced to range 504. Note that the Pdata range 504 for MSG1 is in the lower portion of the range 520 for Ppr (the preamble power received by the mobile station) as depicted in FIG. 5.

The Pdata range for the second mobile station group, MSG2, is represented as 506 (which corresponds to the relay station transmit power of Prs2), and the Pdata range for the third mobile station group, MSG3, is represented as 508 (which corresponds to the relay station transmit power of Prs3).

The different mobile station groups MSG1, MSG2, and MSG3 are served by the relay station at different times. In other words, within a first time interval, the relay station transmits downlink data to mobile stations in group MSG1 at power Prs1; within a second time interval, the relay station transmits downlink data to mobile stations in group MSG2 at power Prs2; and within a third time interval, the relay station transmits downlink data to mobile stations in group MSG3 at power Prs3.

Note that all relay stations within a coverage area of a base station are set to transmit at the same power at the same time. In other words, all relay stations within the coverage area will transmit at Prs1 in the first time interval; all relay stations within the coverage area will transmit at Prs2 in the second time interval; and so forth. This ensures that the C/I performance is not adversely impacted.

Note that it is possible that some relay stations may have fewer mobile station groups (due to fewer mobile stations being in the corresponding coverage zones or fewer path loss differences).

Figure 6:
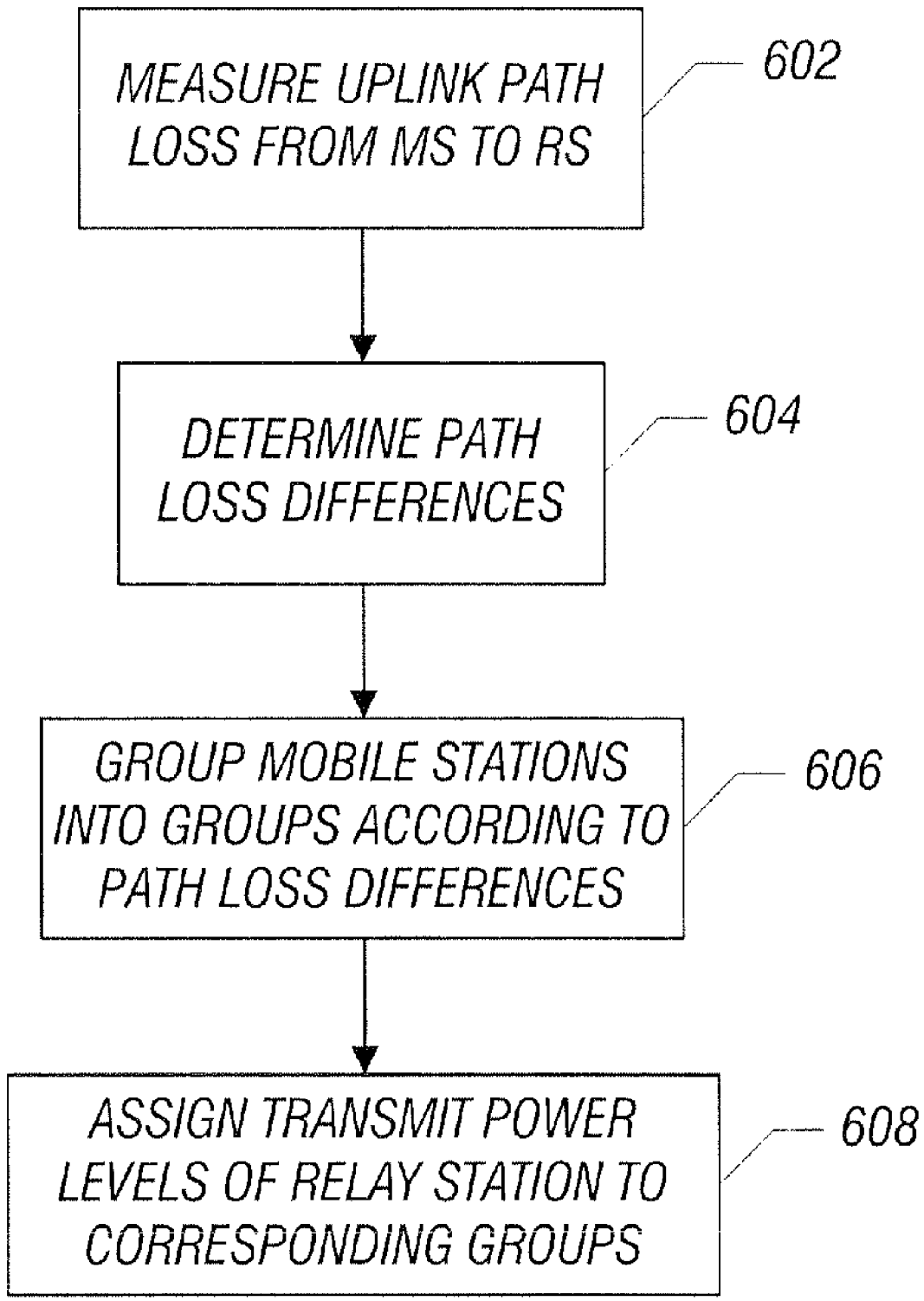
FIG. 6 is a flow diagram of a process of grouping mobile stations into multiple groups, in accordance with another embodiment.

FIG. 6 illustrates a procedure for performing downlink communications with mobile stations in multiple mobile station groups, as discussed above. For each mobile station in the coverage zone of a relay station, the relay station can measure (at 602) the uplink path loss from the mobile station to the relay station. The uplink path loss is equal to the downlink path loss Lrs, due to reciprocity (the same frequency is used on the uplink and downlink between the relay station and mobile station). The relay station then determines (at 604) the path loss difference (Lbs−Lrs) for each mobile station in the relay station's coverage zone. Based on the calculated path loss differences, the relay station next groups (at 606) the mobile stations into corresponding ones of multiple mobile station groups. For example, if the path loss difference has a range between Lmin and Lmax (minimum path loss and maximum path loss, respectively), then the MSG3 group can be defined from Lmin to L1, the MSG2 group can be defined from L1 to L2, and the MSG1 group can be defined from L2 to Lmax, where Lmin<L1<L2<Lmax. The number of mobile station groups are selected based on how much difference between the preamble receive power (Ppr) and the data receive power (Pdata) the AGC circuit of a mobile station can tolerate.

Since a mobile station may move within a coverage area, the uplink path loss of each mobile station must be continually monitored and some reassignments in power levels and group assignments may have to be performed.

The relay station next assigns (at 608) respective transmit power levels (e.g., Prs1, Prs2, Prs3) to the corresponding mobile station groups (e.g., MSG1, MSG2, MSG3). Downlink communication can then proceed between the relay station and corresponding mobile stations in the relay station's coverage zone using one of the plural transmit powers (e.g., Prs1, Prs2, Prs3) based on which group each mobile station is located in.

Figure 7:
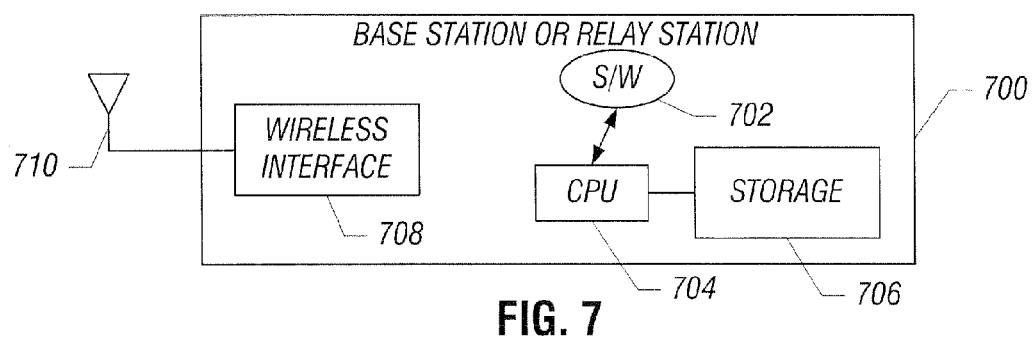
FIG. 7 is a block diagram of a system such as a base station or relay station, in which an embodiment can be incorporated.

FIG. 7 is a block diagram of a system 700, which can be one of the base station 100 or relay station 102 (FIG. 1). The system 700 includes software 702 executable on one or more central processing units (CPUs) 704 that is (are) connected to a storage 706. The software 702 is executable to perform tasks described above. The system 700 further includes a wireless interface 708 connected to an antenna 710 to perform wireless communications (e.g., radio frequency or RF communications).

Instructions of the software 702 are loaded for execution on a processor, such as the one or more CPUs 704. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a wireless network including a base station and a relay station for extending wireless coverage of the base station, the method comprising:
  communicating downlink data sent by the base station and relayed through the relay station to a mobile station, wherein the downlink data is associated with control information that is sent directly from the base station to the mobile station; and
  adjusting a transmit power of the relay station for transmitting the downlink data from the relay station to the mobile station to reduce a difference between a first power level of the control information received at the mobile station and a second power level of the downlink data received at the mobile station.

2. The method of claim 1, wherein adjusting the transmit power is performed by the relay station.

3. The method of claim 1, wherein adjusting the transmit power is performed by the base station.

4. The method of claim 1, wherein the transmit power of the relay station is adjusted based on a message from the base station.

5. The method of claim 4, further comprising the base station determining a difference between a first path loss from the base station to the mobile station and a second path loss from the relay station to the mobile station, wherein the adjustment of the transmit power of the relay station is based on the determined difference.

6. The method of claim 1, further comprising:
dividing plural mobile stations within a zone of the relay station into multiple groups; and
communicating with the mobile stations in the multiple groups at different times.

7. The method of claim 6, further comprising:
transmitting, by the relay station, downlink data to the mobile stations in the different groups at different transmit powers.

8. The method of claim 7, wherein transmitting the downlink data to the mobile stations in the different groups at different transmit powers comprises at least:
transmitting downlink data from the relay station to a mobile station in a first group at a first transmit power; and
transmitting downlink data from the relay station to a mobile station in a second group at a second transmit power.

9. The method of claim 7, further comprising:
storing information relating to multiple groups of mobile stations, wherein mobile stations are assigned to the multiple groups based on relay station path losses between the mobile stations and the relay station.

10. The method of claim 9, wherein base station path losses are present between the base station and the mobile stations, and wherein the mobile stations are assigned to the multiple groups based on differences between respective base station path losses and respective relay station path losses.

11. A base station for use in a wireless network having a relay station that is able to relay data between a mobile station and the base station, the base station comprising:
a wireless interface to transmit downlink data to the mobile station through the relay station, wherein the downlink data is associated with control information sent directly from the base station to the mobile station; and
a processor to adjust a transmit power of the relay station for transmitting the downlink data to achieve a relationship between a first power level of the control information received by the mobile station and a second power level of the downlink data received by the mobile station such that the mobile station is able to successfully recover the downlink data.

12. The base station of claim 11, wherein the processor is to assign mobile stations to multiple groups of mobile stations based on relay station path losses between the mobile stations and the relay station.

13. The base station of claim 12, wherein base station path losses are present between the base station and the mobile stations, and wherein the mobile stations are assigned to the multiple groups based on differences between respective base station path losses and respective relay station path losses.

14. The relay station of claim 11, wherein the processor is to further:
determine a difference between a first path loss between the base station and the mobile station and a second path loss between the relay station and the mobile station, wherein the transmit power of the relay station is adjusted based on the difference.

15. The relay station of claim 11, wherein the base station is a Worldwide Interoperability for Microwave Access (WiMax) base station.

16. An article comprising at least one computer-readable storage medium containing instructions that when executed cause a base station to:
transmit downlink data to a mobile station through a relay station;
transmit control information directly to the mobile station, wherein the control information is associated with the downlink data; and
adjust a transmit power of the relay station for transmitting the downlink data from the relay station to the mobile station to reduce a difference between a first power level of the control information received at the mobile station and a second power level of the downlink data received at the mobile station.

17. The article of claim 16, wherein the instructions when executed cause the base station to:
group mobile stations into multiple groups according to path losses between the mobile stations and the relay station.

18. The article of claim 16, wherein the instructions when executed cause the relay station to further:
transmit downlink data to the mobile stations in different ones of the multiple groups at different power levels.

* * * * *

UNITED STATES PATENT AND TRADEMARK OFFICE
CERTIFICATE OF CORRECTION

Page 1 of 1

PATENT NO. : 8,320,826 B2
APPLICATION NO. : 12/197767
DATED : November 27, 2012
INVENTOR(S) : Senarath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this
Seventh Day of May, 2013

Teresa Stanek Rea
*Acting Director of the United States Patent and Trademark Office*